United States Patent [19]

Kaneko

[11] Patent Number: 5,409,578
[45] Date of Patent: Apr. 25, 1995

[54] METHOD OF DISTILLING WATER BY USE OF SOLAR HEAT

[76] Inventor: Toshio Kaneko, 18-14, 2-bancho, Kurakuen, Nishinomiya-shi Hyogo, Japan

[21] Appl. No.: 108,496

[22] Filed: Aug. 18, 1993

Related U.S. Application Data

[63] Continuation of Ser. No. 852,345, Mar. 17, 1992, abandoned, which is a continuation of Ser. No. 621,428, Dec. 5, 1990, abandoned.

[30] Foreign Application Priority Data

Dec. 8, 1989 [JP] Japan ............. 1-320159

[51] Int. Cl.⁶ ............. B01D 3/00; C02F 1/14
[52] U.S. Cl. ............. 203/10; 159/903; 159/904; 202/234; 203/DIG. 1; 203/DIG. 17; 203/DIG. 20
[58] Field of Search ......... 203/10, DIG. 1, DIG. 17, 203/DIG. 20; 159/903, 904; 202/234

[56] References Cited

U.S. PATENT DOCUMENTS

| | | | |
|---|---|---|---|
| 2,006,985 | 7/1935 | Claude et al. | 203/DIG. 1 |
| 2,636,129 | 4/1953 | Agnew | 203/DIG. 1 |
| 3,076,096 | 1/1963 | Bachmann | 203/DIG. 1 |
| 3,357,898 | 12/1967 | Novakovich | 159/904 |
| 3,415,719 | 12/1968 | Telkes | 159/904 |
| 3,875,926 | 4/1975 | Frank | 203/DIG. 1 |
| 4,062,735 | 12/1977 | Kopp, Jr. | 203/10 |
| 4,151,046 | 4/1979 | Eidelberg | 203/10 |
| 4,197,162 | 4/1980 | Cardinal, Jr. | 159/904 |
| 4,219,387 | 8/1980 | Gruntman | 159/904 |
| 4,235,678 | 11/1980 | McKeen | 203/DIG. 1 |
| 4,292,136 | 9/1981 | Clavier | 203/DIG. 1 |
| 4,300,530 | 11/1981 | Tetirick | 126/450 |
| 4,326,923 | 4/1982 | Mortenson | 203/DIG. 1 |
| 4,459,177 | 7/1984 | O'Hare | 203/DIG. 1 |
| 4,672,950 | 6/1987 | Assaf et al. | 126/452 |
| 4,959,127 | 9/1990 | Michna | 203/DIG. 1 |
| 5,112,446 | 5/1992 | Vallon | 203/10 |

FOREIGN PATENT DOCUMENTS

| | | | |
|---|---|---|---|
| 3440842 | 5/1986 | Germany . | |
| 0135667 | 10/1979 | Japan | 159/904 |
| 0977852 | 12/1964 | United Kingdom | 159/904 |

*Primary Examiner*—Virginia Manoharan
*Attorney, Agent, or Firm*—Wenderoth, Lind & Ponack

[57] ABSTRACT

A method for transferring water upwardly and distilling it and/or of generating electricity by harnessing the heat of sunrays. The method includes placing a panel or a sheet which permits sunrays to pass therethrough near a water surface, evaporating the sea or lake water by heating it with sunrays passing through the panel or sheet, then, letting the steam thus produced rise up to a higher level due to its pressure. The steam is then cooled down to produce distilled water and/or, it is used to generate electricity.

5 Claims, 1 Drawing Sheet

METHOD OF DISTILLING WATER BY USE OF SOLAR HEAT

This application is a continuation of now abandoned application Ser. No. 07/852,345 filed on Mar. 17, 1992, which is a continuation of abandoned application Ser. No. 07/621,428 filed on Dec. 5, 1990.

BACKGROUND OF THE INVENTION

The present invention relates to a method of transferring water from one level to a higher level so as to allow sea, lake, or river water to be used for irrigation of desert or as water for afforestation or for drinking.

Heretofore, water has been transferred upwardly for use in irrigation of desert or afforestation by pumping sea, lake or river water to a higher level. In exercising this operation, sea water needs to be turned into fresh water. In prior art systems, the water is evaporated by heating in a heating apparatus using petroleum as the fuel and, then, the steam thus generated is cooled, thereby yielding distilled water.

The prior art methods of power generation making use of steam rely on the production of steam using a heating apparatus.

As hereabove-described, in the conventional methods of transferring water to a higher level and of distilling water, it is necessary to provide a pump for transferring sea, lake or river water to a higher level and to provide a power source for driving the pump, thereby resulting in high costs. Furthermore, the conventional water transfer/distillation method and steam power generation method require a heating apparatus and fuel for its operation, thus resulting in very high installation and running costs.

SUMMARY OF THE INVENTION

The object of this invention is to eliminate the above-noted disadvantages of the conventional methods of transferring water to higher levels and distillation of water, and steam power generation, to thereby provide a method of water transfer/distillation and/or power generation by harnessing solar heat, which can be implemented at low costs.

According to the method of water transfer/distillation of this invention, the water in a water tank or the water at the surface of a sea or the like is directly evaporated by solar heat and the steam thus produced is raised to a high level by making use of its pressure and its rising force. Therefore, the usual need for a pump to transfer the water to a higher level, and the power source therefor are obviated, and the costs for installation is greatly curtailed. In addition, the method of water transfer/distillation or power generation of this invention does not require any large scale equipment nor fuel for heating, because the solar heat is harnessed for evaporation of water, resulting in larger cutbacks in installation and running costs. In addition, since the surface of the sea or lake water is covered with a sheet or a panel over a predetermined area, rising of steam from the water surface may be diminished by substantially increasing the area, thereby preventing the formation of typhoons.

Additional objects of this invention and effects to be achieved thereby will be more clearly understood by the following description taken in connection with embodiments thereof.

DETAILED DESCRIPTION OF THE INVENTION

Figure 1:
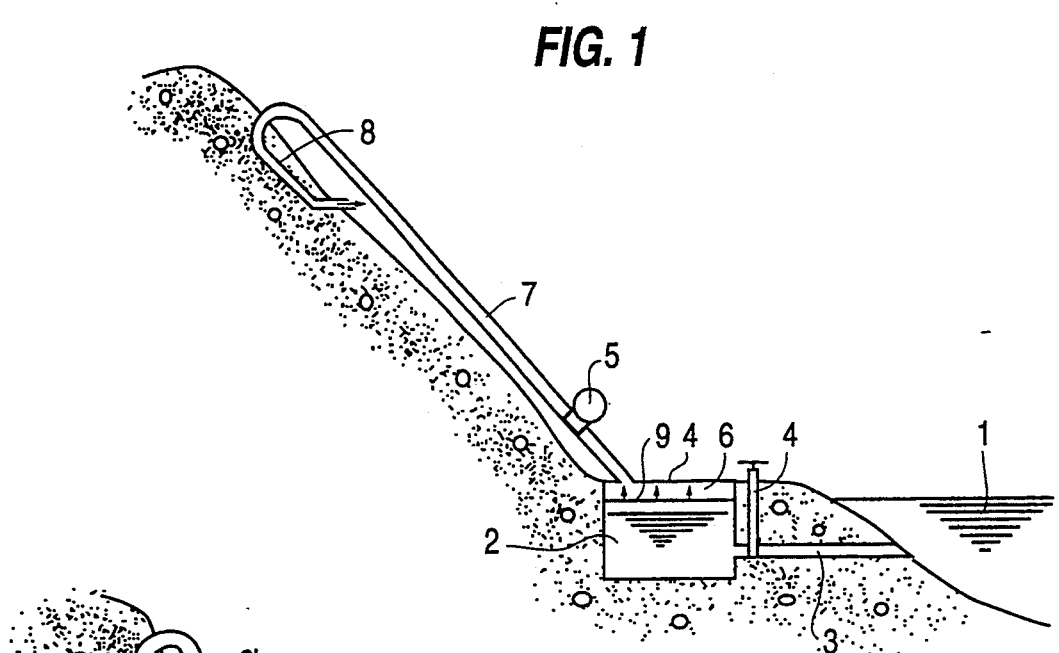
FIG. 1 is a schematic longitudinal view of a system according to a first embodiment of the present invention.

FIG. 1 illustrates an embodiment of the water transfer/distillation method of this invention. A water tank 2 is placed on land near a sea, lake or river 1 and this sea, lake, or river water is allowed to enter the tank 2 through a water feed pipe 3 which has one end communicating with the sea, lake or river 1. A valve 4' is provided in the water feed pipe 3 for selectively interrupting the flow of sea, lake or river water into the tank 2. The top of the water tank 2 is covered and hermetically sealed by a transparent panel 4 which permits transmission of sunrays into the tank. Between this panel 4 and the water level 9 inside the water tank 2, a space is provided and defines a steam pressure chamber 6. Numeral 7 designates a steam delivery pipe for leading the steam generated in the aforementioned water tank 2 to a predetermined location, such as a hilltop, a hillside, or the like, at a level above the level of the panel 4. The lower end of the pipe 7 communicates with the steam pressure chamber 6, while the upper end of the pipe 7 is bent into a U-shape, so as to be connected with a cooling passage 8 buried in the ground. This cooling passage 8 has an outlet opening out of the ground.

In the above-described system, the water stored in the water tank 2 is evaporated by heat produced by the sunrays passing through the panel 4, such that high pressure steam is generated in the steam pressure chamber 6. Because of the pressure of this steam and its rising force due to the difference in its specific gravity and the specific gravity of the ambient air, the steam in the steam pressure chamber 6 rises through the delivery pipe 7 and turns into distilled water upon being cooled in the cooling passage 8 buried in the ground. The distilled water thus obtained can be used in afforestation or for irrigation, drinking water, or the like. Further, a power generator 5 which is designed to take advantage of the steam pressure can be installed along the delivery pipe 7, such that power can also be generated by the steam rising through the delivery pipe 7.

The panel 4 can be replaced as a cover for the water tank 2 by any other transparent sheet, or the like, so long as the sheet permits adequate transmission of sunrays. The steam delivery pipe 7 can be formed of, for example, a transparent vinyl chloride resin pipe, or the like, which will absorb sunrays, so that the decrease in the temperature of the steam can be minimized as the steam rises through the pipe 7. Further, the cooling passage 8 can be arranged in the ambient air, so long as the cooling passage can be maintained sufficiently cold to liquefy the steam. In this embodiment, the steam generated at one water tank 2 is utilized for transferring the water to a higher level, distilling the water and for generating power. However, each of these two functions can be provided, respectively, by individual exclusive water tanks. Such exclusive arrangements are especially desirable for producing electric power in large quantity.

Figure 2:
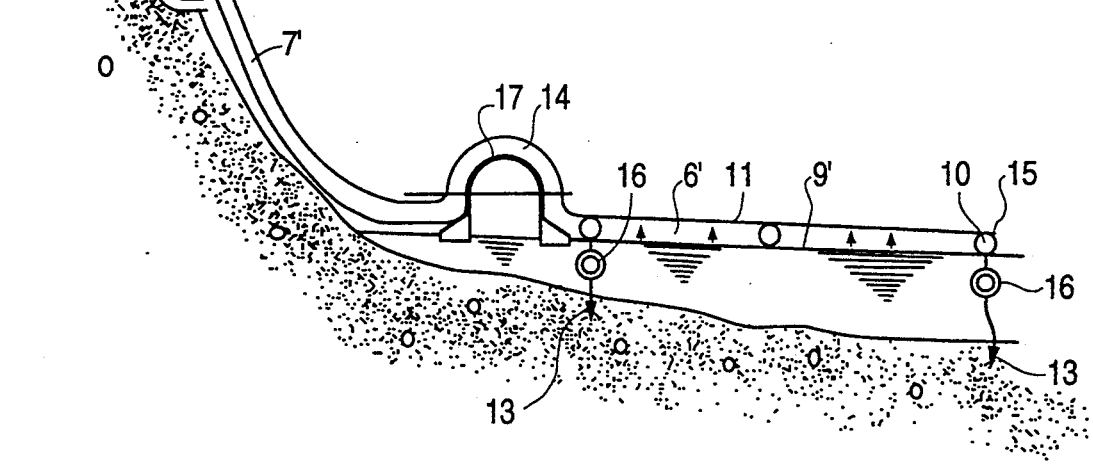
FIG. 2 is a schematic longitudinal sectional view of a system according to a second embodiment of the present invention.
Figure 3:
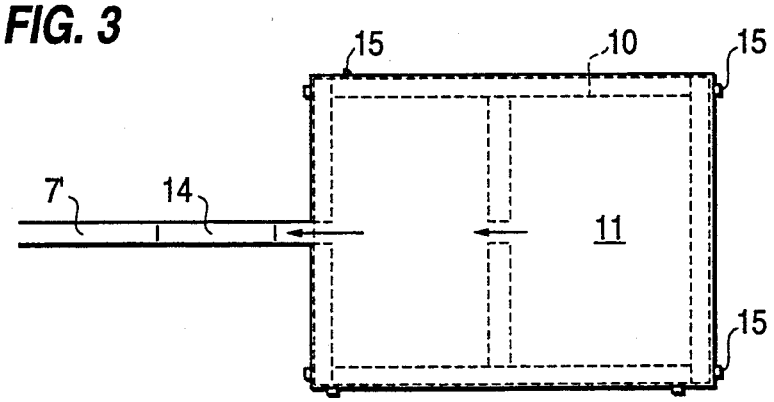
FIG. 3 is a plan view of the system of FIG. 2.

FIGS. 2 and 3 illustrate an embodiment in which steam is generated directly from the sea or lake water surface, instead of providing a water tank 2 such as shown in FIG. 1. Referring to FIGS. 2 and 3, the sea or lake water surface 9' is partitioned by a frame-shaped float (floating frame) 10 floating on the sea or lake water surface 9'. This partitioned portion of the water surface is covered and hermetically sealed by a transparent sheet 11 spanning the aforementioned float 10. The sheet 11 can be a transparent vinyl chloride resin sheet or the like which permits sunrays to pass therethrough as discussed above with respect to panel 4. The sheet 11 spans over the frame so as to form a space between it and the sea or lake water surface 9'. That is, as shown in FIG. 2, the floating frame 10 has an open top which is enclosed only by the sheet 11 and an open bottom which is enclosed only by the surface 9' of the sea or lake. This space enclosed at a top by the sheet 11, at a bottom by the water surface 9' and about its periphery by the floating frame 10, forms a steam pressure chamber 6, similar to the pressure chamber 6 described above. The float 10 is fixed by anchors 13 to the sea or lake bottom to prevent it from floating away. Further, the float 10 is equipped with an alarm lamp or other alarm such as an inductive electric wave oscillator 15 for ensuring safety of ships, with its power to be supplied by an ocean current power generator 17 which is held by the aforementioned anchor 13. Alternatively, a wave power generator or a steam power generator making use of the steam generated, can be used in place of the ocean current power generator 14. A steam delivery pipe 7' is connected so that its lower end communicates with the inside of the steam pressure chamber 6' on the back of the aforementioned sheet 11, and so that its upper side is bent into a U-shape, in a manner similar to the first embodiment, to be connected to a cooling passage 8' which, like the cooling passage of the first embodiment, is buried in the ground and has an outlet opening out of the ground. Further, in order to avoid hindering the passage of ships, the delivery pipe 7' is provided with an arched part 14 supported by a frame which floats on the sea or lake water surface or is installed on the sea bottom between the aforementioned float 10 and the land, so as to allow ships to pass under this arched part 14 of the delivery pipe 7'.

In this embodiment, the sea or lake water is evaporated directly from the sea or lake surface by the solar heat transferred through the sheet 11. The steam produced in the chamber 6' by the solar heat rises from the steam pressure chamber 6' due to the steam pressure and its rising force, in a manner similar to that described above in the first embodiment. Then, when the steam enters the cooling passage 8 it is cooled and thereby turned into distilled water. This embodiment, which comprises covering the sea or lake water surface 9 with a sheet 11, has the advantage that it does not result in the formation of typhoons which results from the steam rising from the sea or lake water surface. It should be noted that the aforementioned sheet 11 may be replaced with a transparent panel like the one shown in FIG. 1 and the cooling passage 8' may be arranged in the air as discussed above with respect to cooling passage 8 of the first embodiment.

This invention is not restricted by the above-described embodiments, but permits various changes or modifications to be made, without departing from the scope of the appended claims.

What is claimed is:

1. A method of distilling and transferring water upwardly, comprising the steps of:
   locating a water tank adjacent a sea, lake, or river at substantially the same height as water in the sea, lake or river;
   connecting a water feed pipe between said water tank and the water in the sea, lake or river, such that water can flow into said water tank to a height substantially the same as the height of the water in the sea, lake, or river;
   mounting a selectively openable and closable valve in said water feed pipe to allow the water feed pipe to be closed to prevent water from flowing between the water tank and the sea, lake or river;
   covering said water tank with a sheet or panel which permits sunrays to be transmitted therethrough, so as to form an enclosed pressure chamber between said sheet or panel and the surface of the water in said water tank, such that water is evaporated by heat from the sunrays to form steam in the pressure chamber; and
   connecting a conduit to said pressure chamber such that said conduit extends from said pressure chamber and upwardly along a hillside, located adjacent the sea, lake or river, to a location above said surface of the water in said water tank, so as to allow the steam produced in said pressure chamber by heat from the sunrays to be raised upwardly by its own pressure and its rising force in said conduit; and
   locating a cooling passage underground in the hillside adjacent said location connecting said conduit to said cooling passage, and cooling said steam to cause it to condense into distilled water in said cooling passage.

2. A method as recited in claim 1, wherein
   said step of locating a water tank adjacent a sea, lake, or river comprises forming a recess in the ground adjacent the sea, lake, or river.

3. A method of water distillation and power generation, comprising the steps of:
   locating a water tank adjacent a sea, lake, or river at substantially the same height as water in the sea, lake or river;
   connecting a water feed pipe between said water tank and the water in the sea, lake or river, such that water can flow into said water tank to a height substantially the same as the height of the water in the sea, lake, or river;
   mounting a selectively openable and closable valve in said water feed pipe to allow the water feed pipe to be closed to prevent water from flowing between the water tank and the sea, lake or river;
   covering said water tank with a sheet or panel which permits sunrays to be transmitted therethrough, so as to form an enclosed pressure chamber between said sheet or panel and the surface of the water in said water tank, such that water is evaporated by heat from the sunrays to form steam in the pressure chamber;
   connecting a conduit to said pressure chamber such that said conduit extends from said pressure chamber and upwardly along a hillside, located adjacent the sea, lake, or river, to a location above said surface of the water in said water tank, so as to allow the steam produced in said pressure chamber by heat from the sunrays to be raised upwardly by its own pressure and its rising force in said conduit;

mounting a steam pressure-to-power generating means to said conduit for generating power as pressurized steam is forced upwardly through said conduit; and locating a cooling passage underground in the hillside adjacent said location connecting said conduit to said cooling passage, and cooling said steam to cause it to condense into distilled water.

4. A method as recited in claim 3, wherein said step of locating a water tank adjacent a sea, lake, or river comprises forming a recess in the ground adjacent the sea, lake, or river.

5. A method of distilling and transferring water upwardly, comprising the steps of:

forming a pressure chamber in a sea or lake by surrounding a section of water with an open-bottom floating frame which floats on the water, and covering said section of water by mounting across said floating frame a sheet or panel which permits sunrays to be transmitted therethrough and to the section of water surrounded by said floating frame, such that said pressure chamber is enclosed at a bottom thereof by only a surface of said section of water, at a top thereof by said sheet or panel, and about a periphery thereof by said floating frame, such that water is evaporated by heat from the sunrays to form steam in the pressure chamber;

connecting a conduit to said pressure chamber such that said conduit extends from said pressure chamber and upwardly along a hillside, located adjacent the sea or lake, to a location above the surface of said section of water, so as to allow steam produced in said chamber by heat from the sunrays to be raised upwardly by its own pressure and its rising force in said conduit; and locating a cooling passage underground in the hillside adjacent said location connecting said conduit to said cooling passage, and cooling said steam to cause it to condense into distilled water.

* * * * *